United States Patent
McConnell et al.

(10) Patent No.: US 12,458,052 B2
(45) Date of Patent: Nov. 4, 2025

(54) HUMAN MILK OLIGOSACCHARIDES FOR USE IN ENHANCING EXECUTIVE FUNCTION

(71) Applicant: Glycom A/S, Hørsholm (DK)

(72) Inventors: Bruce McConnell, La Tour de Peilz (CH); Louise Kristine Vigsnæs, Copenhagen NV (DK); Jonas Hauser, Lausanne (CH); Nora Schneider, Les Monts-de-Corsier (CH)

(73) Assignee: Glycom A/S, Hørsholm (DK)

( * ) Notice: Subject to any disclaimer, the term of this patent is extended or adjusted under 35 U.S.C. 154(b) by 872 days.

(21) Appl. No.: 17/435,944

(22) PCT Filed: Mar. 5, 2020

(86) PCT No.: PCT/IB2020/051904
§ 371 (c)(1),
(2) Date: Sep. 2, 2021

(87) PCT Pub. No.: WO2020/178774
PCT Pub. Date: Sep. 10, 2020

(65) Prior Publication Data
US 2022/0160013 A1 May 26, 2022

(30) Foreign Application Priority Data

Mar. 5, 2019 (EP) .................................... 19160876
Mar. 6, 2019 (EP) .................................... 19161023
Dec. 9, 2019 (DK) .......................... PA 2019 01446
Dec. 9, 2019 (EP) .................................... 19214414

(51) Int. Cl.
A23L 33/00 (2016.01)
A23L 33/125 (2016.01)
A61K 31/702 (2006.01)
A61P 25/28 (2006.01)

(52) U.S. Cl.
CPC ............. *A23L 33/40* (2016.08); *A23L 33/125* (2016.08); *A61K 31/702* (2013.01); *A61P 25/28* (2018.01)

(58) Field of Classification Search
CPC ........ A23L 33/125; A23L 33/40; A61P 25/00; A61P 25/28; A61K 31/702
See application file for complete search history.

(56) References Cited

U.S. PATENT DOCUMENTS 11,026,444 B2 * 6/2021 Yan ...................... A61K 31/702
2020/0108084 A1 * 4/2020 Yan ...................... A61K 35/741

FOREIGN PATENT DOCUMENTS

| CN | 103763940 A | 4/2014 |
| CN | 107427057 A | 12/2017 |
| WO | 2014043368 A1 | 3/2014 |
| WO | 2015100091 A1 | 7/2015 |
| WO | 2016146789 A1 | 9/2016 |
| WO | 2017103019 A1 | 6/2017 |
| WO | 2018020473 A1 | 2/2018 |
| WO | 2018215406 A1 | 11/2018 |
| WO | 2018215572 A1 | 11/2018 |

OTHER PUBLICATIONS

PCT/IB2020/051904, "International Search Report" and "Written Opinion of the International Searching Authority", PCT, May 4, 2020, pp. 1-20.
Xi Chen, Human Milk Oligosaccharides (HMOS): Structure, Function, and Enzyme-Catalyzed Synthesis, Advances in Carbohydrate Chemistry and Biochemistry, vol. 72 ISSN 0065-2318, 2015, pp. 1-78.
T. Urashima, "Milk Oligosaccharides", Advanced Dairy Chemistry, vol. 3: Lactose, Water, Salts and Minor Constituents, 2009, pp. 295-349.
F. Josef Van Der Staay, "The appetitively motivated "cognitive" holeboard: A family of complex spatial discrimination tasks for assessing learning and memory", Neuroscience and Biobehavioral Reviews 36, 2012, pp. 379-403.
C. Sun et al., "Diverse Galactooligosaccharides Differentially Reduce LPS-Induced Inflammation in Macrophages", MDPI, Foods 2022, No. 11, Dec. 8, 2022, pp. 1-13.
X. Yang et al., "Effects of prebiotic galacto-oligosaccharide on postoperative cognitive dysfunction and neuroinflammation through targeting of the gut-brain axis", BMC Anesthesiology, (2018), pp. 1-11.
K.Oberauer, "Working Memory and Attention—A Conceptual Analysis and Review", Journal of Cognition, (2019), pp. 1-23.
F.J. van der Staay, "The appetitively motivated "cognitive" holeboard: A family of complex spatial discrimination tasks for assessing learning and memory", Neuroscience and Biobehavioral Reviews, Jul. 2, 2011, pp. 379-403.
P.H. Zimmerman et al., "The Observer XT: A tool for the integration and synchronization of multimodal signals", Proceedings of Measuring Behavior 2008, Aug. 2008, pp. 125-126.

* cited by examiner

*Primary Examiner* — Pancham Bakshi
(74) *Attorney, Agent, or Firm* — Kunzler Bean & Adamson; Thomas D Briscoe (57) ABSTRACT

Use of a human milk oligosaccharide (HMO), or a nutritional composition comprising a human milk oligosaccharide, to enhance executive function in a non-infant, to prevent and/or reduce the risk of sub-optimal executive function in a non-infant, to manage sub-optimal executive functioning in a non-infant, and/or to improve myelination to mature the pre-frontal cortex region of the brain in a non-infant, as well as synthetic compositions of HMOs and packs comprising at least 14 individual daily doses of an effective amount of at least one HMO for such a use.

6 Claims, 4 Drawing Sheets

HUMAN MILK OLIGOSACCHARIDES FOR USE IN ENHANCING EXECUTIVE FUNCTION

CROSS-REFERENCE TO RELATED APPLICATIONS

This application is a National Stage Entry under 35 U.S.C. § 371 of International Application PCT/IB2020/051904 filed on Mar. 5, 2020, which claims priority to the following applications: EP19160876.9 filed on Mar. 5, 2019; EP19161023.7 filed Mar. 6, 2019, DK PA 201901446 filed on Dec. 9, 2019; and EP19214414 filed on 2019 Dec. 9, the entirety of each of which are incorporated herein by reference to the extent permitted by applicable patent laws and rules.

The present invention relates to the use of a human milk oligosaccharide (HMO) or a composition comprising an HMO, to enhance executive function in a non-infant. The invention further relates to an HMO or a composition comprising an HMO, for use in the prevention or management of sub-optimal executive functioning in a non-infant.

BACKGROUND OF THE INVENTION

Executive function is the ability to coordinate and integrate cognitive-perceptual processes in relation to time and space, determining how well a subject can recognise, evaluate, and make a choice among a variety of alternative options and strategies. It governs goal directed behaviour and plays a fundamental role in regulating higher-order cognitive processes such as problem solving, reasoning, flexible thinking, and decision-making. It is central to cognitive development and learning (especially of new skills) and has been strongly associated with social and intellectual/academic success and/or achievement.

In humans, the abilities associated with executive function do not all develop at once. Instead they develop in a sequence with one skill building on a previous skill. All executive functions interact with each other, and impact how humans regulate their behaviour to create positive future outcomes. Usually executive function begin developing by age two and is fully developed by age 30. Executive function usually begins to decline after the age of 30 years, most commonly in relation to memory.

It is thought that executive function is mediated by the prefrontal cortex. Generally, information is stored in the back of brain and humans use the prefrontal cortex use to process stored information to be socially effective and succeed in life. Executive function requires four major control circuits as follows:

- A task-orientated circuit which controls working memory, allowing execution of plans, specific steps needed to complete tasks, and achievement of goals.
- A timing-orientated circuit permits organisation of the order in which tasks are completed, and addressing of timelines.
- An emotion-orientated circuit which controls emotions and mood.
- An awareness orientated circuit which controls self-awareness of feelings and experiences.

Non-infant humans with inadequate executive function (or executive function disorder—EFD) struggle to organise and regulate their behaviour in ways that will help them accomplish long-term goals. Generally, non-infant humans who have EFD are more likely to be motivated to act by short-term goals, rather than longer-term goals. The result of inadequate executive function is usually less success in life.

Despite the very real impact of EFD, the Diagnostic and Statistical Manual of Mental Disorders (DSM-5) does not recognise EFD as a specific mental health condition. Instead, executive function issues are symptomatic of other neurological, mental health, and behavioural disorders. Hence there is no diagnosis of EFD as such but a diagnosis of neurological, mental health or behavioural disorder which involves symptoms of executive dysfunction. Typical symptoms are trouble controlling emotions or impulses, problems with starting, organising, planning, or completing tasks, trouble listening or paying attention, short-term memory issues, inability to multitask or balance tasks, socially inappropriate behaviour, inability to learn from past consequences, difficulty solving problems and difficulty learning or processing new information.

Once symptoms are apparent, a variety of tests can be used to help assess a person's executive function. For example, the Stroop task test to evaluate a person's mental control and selective attention, trail making tests, clock drawing tests, verbal fluency tests, and card sorting tests. Otherwise, if a specific mental disorder is suspected, the medical professional may skip executive functioning tests and instead compare the person's symptoms with standard diagnostic criteria for that disorder, or use an MRI scan to detect physical causes such as stroke damage or a brain tumour.

Diagnosable conditions that can cause executive function issues include Attention Deficiency Hyperactivity Disorder (ADHD), depression and anxiety, bipolar disorder, schizophrenia, obsessive-compulsive disorder (OCD), autism, Alzheimer's disease, frontotemporal dementia, Lewy body dementia, Tourette's syndrome, Post Traumatic Stress Disorder (PTSD), traumatic injuries to the brain. However, there may also be temporary causes to executive function issues such as exhaustion, severe pain, stress, distracting environments, drug use, alcohol use, and severe boredom. Further, people born preterm or small for gestational age (SGA) appear to be at greater risk of suffering from executive function issues. The type of treatment used when an executive function issue or disorder is present depends on the diagnosed condition believed to cause the issue or dysfunction. Treatment options may include stimulant medications, antidepressants, antipsychotic medications, psycho-education, occupational or speech therapy and cognitive behavioural therapy (CBT). The first line treatment is usually occupational or speech therapy, psychological therapy, reading tutoring or CBT. When used in combination with medication to treat the diagnosed disorder, CBT can be very effective at treating executive dysfunction including problems with inhibition, emotion regulation, time management, and planning in adults. However, CBT is less effective with children. Also, there is not always effective medication for the diagnosed disorder, or the medication has serious side-effects which reduces patient compliance. Further, approaches to prevent executive function issues or disorders in at risk non-infant humans are extremely limited.

Therefore there remains a need for a safe, well tolerated, means of preventing or managing executive function issues or disorders in non-infant humans.

SUMMARY OF THE INVENTION

It has now been surprisingly found that human milk oligosaccharides may prevent executive function issues or disorders, may enhance executive function, and may enable better management of executive function issues or disorders in non-infant humans.

Accordingly, in a first aspect, this invention relates to a human milk oligosaccharide (HMO) or a synthetic composition comprising an HMO for use in
 a) enhancing executive function in a non-infant,
 b) prevention and/or reduction of risk of sub-optimal executive functioning in a non-infant,
 c) management of sub-optimal executive functioning in a non-infant, and/or
 d) improving myelination to mature the pre-frontal cortex region of the brain of the non-infant.

Preferably, the synthetic composition contains an amount of 0.5 g to 15 g of the HMO; more preferably 1 g to 10 g. For example, the synthetic composition may contain 2 g to 7 g of the HMO.

The synthetic composition may contain a bifidobacteria; for example, Bifidobacterium longum and/or Bifidobacterium bifidum.

A second aspect of the invention relates to a pack for use in
 a) enhancing executive function in a non-infant,
 b) prevention and/or reduction of risk of sub-optimal executive functioning in a non-infant,
 c) management of sub-optimal executive functioning in a non-infant, and/or
 d) improving myelination to mature the pre-frontal cortex region of the brain of the non-infant,
the pack comprising at least 14 individual daily doses of an effective amount of at least one human milk oligosaccharide (HMO).

Preferably, each dose in the pack contains about 0.5 g to 15 g of the human milk oligosaccharide, more preferably 1 g to 10 g, even more preferably 2 g to 7 g.

The pack preferably comprises at least about 21 daily doses; for example, about 28 daily doses.

The pack may contain a bifidobacteria; for example, Bifidobacterium longum and/or Bifidobacterium bifidum.

A third aspect of the invention provides a method for enhancing executive function in a non-infant, the method comprising administering to the non-infant an effective amount of at least one human milk oligosaccharide (HMO).

Preferably, the method is effective at enhancing a non-infant's ability to recognise, evaluate, and/or make a choice among a variety of alternative options and/or strategies. Preferably the method further comprises providing the non-infant with cognitive behavioural therapy.

A fourth aspect of the invention provides a method for the prevention of and/or reduction of risk of sub-optimal executive functioning in a non-infant, the method comprising administering to the non-infant an effective amount of at least one human milk oligosaccharide (HMO).

The HMO may be administered to a non-infant who is at risk of developing sub-optimal executive functioning later in life. In such a case, the method further comprises identifying a non-infant who is at risk of developing sub-optimal executive functioning later in life. The non-infant may be an aging human or a child above 3 years of age who was born prematurely or small for gestational age.

Also, the HMO may be administered to a non-infant who previously suffered from sub-optimal executive functioning to prevent and/or reduce risk of reoccurrence, or the severity of reoccurrence.

A fifth aspect of the invention provides a method for the management of sub-optimal executive functioning in a non-infant, the method comprising administering to the non-infant an effective amount of at least one human milk oligosaccharide (HMO).

Preferably, the method is effective at managing a non-infant's reduced ability to recognise, evaluate, and/or make a choice among a variety of alternative options and/or strategies. The method is particularly effective in enhancing short-term and long-term memory in the non-infant and, through this, enhancing executive function.

Preferably, the method further comprises providing the non-infant with cognitive behavioural therapy. In one embodiment, the HMO is administered to the non-infant prior to adulthood (i.e. prior to reaching 18 years of age).

Preferably, the non-infant is administered about 0.5 g to 15 g per day of the human milk oligosaccharide, more preferably 1 g to 10 g per day, even more preferably 2 g to 7 g per day.

The present invention also provides an HMO or a composition comprising an HMO for use in the preparation of a composition for use in the prevention and/or treatment of sub-optimal executive function in a non-infant.

The non-infant may be suffering from one or more of Attention Deficiency Hyperactivity Disorder (ADHD), Alzheimer's disease, depression, anxiety, bipolar disorder, schizophrenia, obsessive-compulsive disorder (OCD), autism, Alzheimer's disease, frontotemporal dementia, Lewy body dementia, Tourette syndrome, Post Traumatic Stress Disorder (PTSD), a traumatic injury to the brain, or vascular dementia.

The HMO may be a fucosylated neutral HMO, a non-fucosylated neutral HMO and/or a sialylated HMO.

In one embodiment, the fucosylated neutral HMO may be 2'-fucosyllactose (2'-FL) and/or difucosyllactose (3,2'-difucosyllactose, DFL).

In one embodiment, the non-fucosylated neutral HMO may be LNT (lacto-N-tetraose), LNnT (lacto-N-neotetraose) or a combination thereof.

In one embodiment, the sialylated oligosaccharide may be 3'-sialyllactose (3'-SL) and/or 6'-sialyllactose (6'-SL).

In context with the invention, particularly effective combinations of HMOs may be:
 2'-FL, DFL, LNT and LNnT,
 3'-sialyllactose (3'-SL) and 6'-sialyllactose (6'-SL), or
 2'-FL, DFL, LNT, LNnT, 3'-sialyllactose (3'-SL) and 6'-sialyllactose (6'-SL).

In a sixth aspect, this invention provide a method for improving myelination to mature the pre-frontal cortex region of the brain of the non-infant, the method comprising administering to the non-infant at least one sialylated human milk oligosaccharide (HMO). The sialylated HMO is 3'-SL, 6'-SL or a combination thereof. Additional HMO may be administered to the non-infant.

Preferably, the non-infant is administered an amount of 0.5 g to 15 g per day of the HMO; more preferably 1 g to 10 g per day. For example, the non-infant may be administered 2 g to 7 g per day. Preferably, the non-infant is administered the HMO for a period of at least 1 week; more preferably for at least 2 weeks.

The non-infant may be administered a higher dose during an initial phase and a lower dose during a maintenance phase. Preferably the non-infant is administered the HMO for a period of at least 1 week; more preferably for at least 2 weeks during the initial phase. The non-infant may be administered the HMO for a period of at least 4 weeks; more preferably for at least 8 weeks during the maintenance phase. The dose administered during an initial phase is preferably about 3 g to about 10 g per day (for example about 4 g to about 7.5 g per day) and the dose administered during a maintenance phase is preferably about 2 g to about 7.5 g per day (for example about 2 g to about 5 g per day).

DETAILED DESCRIPTION OF THE INVENTION

It has now been surprisingly found that oral or enteral administration of one or more human milk oligosaccharides (HMOs) to a non-infant human a) enhances executive function in the non-infant, b) prevents and/or reduces risk of sub-optimal executive functioning in the non-infant, c) manages sub-optimal executive functioning in a non-infant, and/or d) improves myelination to mature the pre-frontal cortex region of the brain of the non-infant.

Herein, the following terms have the following meanings:

"Effective amount" means an amount of an HMO sufficient to render a desired outcome in a human. An effective amount can be administered in one or more doses to achieve the desired outcome.

"Enteral administration" means any conventional form for delivery of a composition to a patient that causes the deposition of the composition in the gastrointestinal tract (including the stomach). Methods of enteral administration include feeding through a naso-gastric tube or jejunum tube, oral, sublingual and rectal.

"Executive function" means the ability to recognise, evaluate, and make a choice among a variety of alternative options and strategies. The term encompasses goal-directed behaviour, planning, and/or cognitive flexibility.

"Non-infant human" or "non-infant" means a human of 3 years of age and older. A non-infant human can be a child, a teenager, an adult or an elderly person (above 65 years of age).

"Human milk oligosaccharide" or "HMO" means a complex carbohydrate found in human breast milk (Urashima et al.: *Milk Oligosaccharides*. Nova Science Publisher (2011); Chen *Adv. Carbohydr. Chem. Biochem.* 72, 113 (2015)). The HMOs have a core structure comprising a lactose unit at the reducing end that can be elongated by one or more β-N-acetyl-lactosaminyl and/or one or β-more lacto-N-biosyl units, and which core structure can be substituted by an α L-fucopyranosyl and/or an α-N-acetyl-neuraminyl (sialyl) moiety. In this regard, the non-acidic (or neutral) HMOs are devoid of a sialyl residue, and the acidic HMOs have at least one sialyl residue in their structure. The non-acidic (or neutral) HMOs can be fucosylated or non-fucosylated. Examples of such neutral non-fucosylated HMOs include lacto-N-tetraose (LNT), lacto-N-neotetraose (LNnT), lacto-N-neohexaose (LNnH), para-lacto-N-neohexaose (pLNnH), para-lacto-N-hexaose (pLNH) and lacto-N-hexaose (LNH). Examples of neutral fucosylated HMOs include 2'-fucosyllactose (2'-FL), lacto-N-fucopentaose I (LNFP-I), lacto-N-difucohexaose I (LNDFH-I), 3-fucosyllactose (3-FL), difucosyllactose (DFL), lacto-N-fucopentaose II (LNFP-II), lacto-N-fucopentaose III (LNFP-III), lacto-N-difucohexaose III (LNDFH-III), fucosyl-lacto-N-hexaose II (FLNH-II), lacto-N-fucopentaose V (LNFP-V), lacto-N-fucopentaose VI (LNFP-VI), lacto-N-difucohexaose II (LNDFH-II), fucosyl-lacto-N-hexaose I (FLNH-I), fucosyl-para-lacto-N-hexaose I (FpLNH-I), fucosyl-para-lacto-N-neohexaose II (F-pLNnH II) and fucosyl-lacto-N-neohexaose (FLNnH). Examples of acidic HMOs include 3'-sialyllactose (3'-SL), 6'-sialyllactose (6'-SL), 3-fucosyl-3'-sialyllactose (FSL), LST a, fucosyl-LST a (FLST a), LST b, fucosyl-LST b (FLST b), LST c, fucosyl-LST c (FLST c), sialyl-LNH (SLNH), sialyl-lacto-N-hexaose (SLNH), sialyl-lacto-N-neohexaose I (SLNH-I), sialyl-lacto-N-neohexaose II (SLNH-II) and disialyl-lacto-N-tetraose (DSLNT).

"Oral administration" means any conventional form for the delivery of a composition to a human through the mouth. Accordingly, oral administration is a form of enteral administration.

"Synthetic composition" means a composition which is artificially prepared and preferably means a composition containing at least one compound that is produced ex vivo chemically and/or biologically, e.g. by means of chemical reaction, enzymatic reaction or recombinantly. In some embodiments, the synthetic composition may comprise one or more compounds or components other than HMOs. Also, in some embodiments, the synthetic compositions may comprise one or more nutritionally or pharmaceutically active components which do not affect adversely the efficacy of the HMO(s). Some non-limiting embodiments of a synthetic composition of the invention are also described below.

"A child above 3 years of age that was born small for gestational age (SGA)" means a child who was smaller in size than normal for their gestational age at birth, most commonly defined as a weight below the 10th percentile for the gestational age. In some embodiments, SGA may be associated with intrauterine growth restriction (IUGR), which refers to a condition in which a foetus is unable to achieve its potential size.

"Low birth weight" means a body weight under 2500 g at birth. It therefore encompasses:
 a child who had a body weight from 1800 to 2500 g at birth (usually called "low birth weight" or LBW),
 a child who had a body weight from 1000 to 1800 g at birth (called "very low birth weight" or VLBW),
 a child who had a body weight under 1000 g at birth (called "extremely low birth weight" or ELBW).

"Preventive treatment" or "prevention" means treatment given or action taken to diminish the risk of onset or recurrence of a disease, or the severity once onset occurs.

"Prophylactically reducing symptom severity and/or occurrence" means reducing the severity and/or occurrence of symptoms at a later point in time.

"Secondary prevention" means prevention of onset of the condition in a high-risk patient, or prevention of reoccurrence of symptoms in a patient who has already has the condition. A "high-risk" patient is an individual who is predisposed to developing the condition, for example, a person with a family history of the condition.

"Manage" means to address a medical condition or disease with the objective of improving or stabilising an outcome in the non-infant or addressing an underlying nutritional need. Manage therefore includes the dietary or nutritional management of the medical condition or disease by addressing nutritional needs of the non-infant. "Managing" and "management" have grammatically corresponding meanings. Manage includes treatment of the non-infant.

"Therapy" means treatment given or action taken to reduce or eliminate symptoms of a disease or pathological condition.

In a first aspect of the present invention there is provided an HMO or a composition comprising an HMO for use in enhancing executive function in a non-infant.

The HMO may be a fucosylated neutral HMO, a non-fucosylated neutral HMO, a sialylated HMO or any combination of any of the foregoing.

In an embodiment, the HMO is a fucosylated neutral HMO.

In an embodiment, the HMO is a non-fucosylated neutral HMO.

In an embodiment, the HMO is a sialylated HMO.

In an embodiment, the HMO is a mixture comprising, consisting essentially of or consisting of one or more fucosylated neutral HMOs and one or non-fucosylated neutral HMOs.

In an embodiment the HMO is a mixture comprising, consisting essentially of or consisting of one or more fucosylated neutral HMOs, one or non-fucosylated neutral HMOs and one or more sialylated HMOs.

Particularly, the one or more fucosylated neutral HMO are selected from 2'-FL, 3-FL, DFL, LNFP-I, LNFP-II, LNFP-III, LNFP-V, LNFP-VI, LNDFH-I, LNDFH-II, LNDFH-III, FLNH-I, FLNH-II, FLNnH, FpLNH-I and F-pLNnH II, preferably 2'-FL, 3-FL and DFL. Particularly effective fucosylated oligosaccharides may be 2'-fucosyllactose (2'-FL) and difucosyllactose (DFL).

Preferably, the one or more non-fucosylated neutral HMOs are selected from LNT, LNnT, LNH, LNnH, pLNH and pLNnH, preferably LNnT and LNT.

The one or more sialylated HMOs are preferably selected from 3'-SL, 6'-SL, LST a, LST b, LST c, DS-LNT, S-LNH and S-LNnH I, more preferably 3'-SL and 6'-SL. HMOs which contain both fucosylated and sialylated moieties may also be used, for example FSL.

In an embodiment the HMO is selected from the group consisting of 2'-fucosyllactose (2'-FL), DFL, LNT, LNnT, a sialyllactose and any combination of the foregoing.

In an embodiment, the HMO is a combination of 2'-FL, DFL, LNT and LNnT, that is comprising, consisting essentially of or consisting of 2'-FL, DFL, LNT and LNnT.

In an embodiment, the HMO is a combination of 3'-sialyllactose (3'-SL) and 6'-sialyllactose (6'-SL), that is comprising, consisting essentially of or consisting of 3'-sialyllactose (3'-SL) and 6'-sialyllactose (6'-SL).

In an embodiment, the HMO is a combination of 2'-FL, DFL, LNT, LNnT, 3'-sialyllactose (3'-SL) and 6'-sialyllactose (6'-SL), that is comprising, consisting essentially of or consisting of 2'-FL, DFL, LNT, LNnT, 3'-sialyllactose (3'-SL) and 6'-sialyllactose (6'-SL).

The HMOs can be isolated or enriched by well-known processes from milk(s) secreted by mammals including, but not limited to human, bovine, ovine, porcine, or caprine species. The HMOs can also be produced by well-known processes using microbial fermentation, enzymatic processes, chemical synthesis, or combinations of these technologies. As examples, using chemistry LNnT can be made as described in WO 2011/100980 and WO 2013/044928, LNT can be synthesized as described in WO 2012/155916 and WO 2013/044928, a mixture of LNT and LNnT can be made as described in WO 2013/091660, 2'-FL can be made as described in WO 2010/115934 and WO 2010/115935, 3-FL can be made as described in WO 2013/139344, 6'-SL and salts thereof can be made as described in WO 2010/100979, sialylated oligosaccharides can be made as described in WO 2012/113404 and mixtures of human milk oligosaccharides can be made as described in WO 2012/113405. As examples of enzymatic production, sialylated oligosaccharides can be made as described in WO 2012/007588, fucosylated oligosaccharides can be made as described in WO 2012/127410, and advantageously diversified blends of human milk oligosaccharides can be made as described in WO 2012/156897 and WO 2012/156898. Further, WO 01/04341 and WO 2007/101862 describe how to make core human milk oligosaccharides optionally substituted by fucose or sialic acid using genetically modified *E. coli*.

The HMO or HMOs, in any of the aspects of the present invention, can be used as it is or they are (neat), without any carrier and/or diluent. In other embodiment, the HMO/HMOs is/are used in a synthetic composition with one or more inert carriers/diluents that are acceptable in nutritional or pharmaceutical compositions, for example solvents (e.g. water, water/ethanol, oil, water/oil), dispersants, coatings, absorption promoting agents, controlled release agents, inert excipients (e.g. starches, polyols, granulating agents, microcrystalline cellulose, diluents, lubricants, binders, and disintegrating agents). These compositions do not contain prebiotic and/or probiotic. In other embodiment, the HMO/HMOs is/are used in a synthetic pharmaceutical or nutritional composition that may contain prebiotic and/or probiotic.

The non-infant may be a healthy non-infant not suffering from sub-optimal executive function.

Executive function may be measured by methods well known to the skilled person, for example by assessing, possibly holistically assessing, different cognitive skills known to make up executive function e.g. inhibition, working memory, cognitive flexibility, pattern recognition tests and the like. For children, the method can be for example Dimensional Change Card Sort (DCCS) task, and for adults, for example, Wisconsin Card Sorting Task. Participants are shown target cards and asked to sort a series of bivalent test cards according to one dimension (e.g., colour). During a post-switch phase, they are told to sort the same types of test cards according to the other dimension (e.g., shape).

A non-infant not suffering from sub-optimal executive functioning would have test scores within ranges deemed normal (non pathological) for example for the type and age of the non-infant.

As would be evident to the skilled person, the HMO or composition comprising an HMO as disclosed herein for use to enhance executive function, may also be used in the prevention and/or treatment of sub-optimal executive function in a non-infant.

Accordingly, in another aspect of the present invention there is provided an HMO or composition comprising an HMO, as disclosed herein, for use in the prevention and/or treatment of sub-optimal executive functioning.

In an embodiment the non-infant may be a non-infant suffering from sub-optimal executive function and therefor in need of an enhancement in executive functioning.

A person suffering from sub-optimal executive function may be a non-infant that does not have test scores (in standard test used to assess executive function) within ranges deemed normal (non pathological) e.g. for the type and age of the non-infant. It is well within the purview of the person skilled in the art to determine when a non-infant is suffering from sub-optimal executive functioning.

Sub-optimal executive functioning may be linked to a variety of cognitive conditions including Attention Deficiency Hyperactivity Disorder (ADHD), Alzheimer's disease, and vascular dementia. It is also believed to be more prevalent in non-infants that were born preterm or small for gestational age (SGA) and, it is known that executive function can decline with aging. There may therefore be a particular need to treat and/or prevent sub-optimal executive functioning in these patient groups.

Accordingly, in a more particular embodiment, the non-infant in need of an enhancement in executive function is a non-infant suffering from ADHD, Alzheimer's disease, or vascular dementia, an aging adult or an child that was born preterm or small for gestational age (SGA).

In another aspect of the present invention there is provided a method of preventing and/or treating sub-optimal executive function in a non-infant, said method comprising the step of administering to said non-infant an HMO or a composition comprising an HMO, as disclosed herein. Said method may also optionally comprise the step of identifying a non-infant suffering from sub-optimal executive functioning.

In another aspect of the present invention there is provided a method of enhancing executive function in a non-infant, said method comprising the step of administering to said non-infant an HMO or composition comprising an HMO as disclosed herein, said method may optionally comprise the step of identifying a non-infant suffering from sub-optimal executive function.

The synthetic composition, in any of the aspects of the invention disclosed above, can be a pharmaceutical composition. The pharmaceutical composition can contain a pharmaceutically acceptable carrier, e.g. phosphate buffered saline solution, mixtures of ethanol in water, water and emulsions such as an oil/water or water/oil emulsion, as well as various wetting agents or excipients. The pharmaceutical composition can also contain other materials that do not produce an adverse, allergic or otherwise unwanted reaction when administered to non-infants. The carriers and other materials can include solvents, dispersants, coatings, absorption promoting agents, controlled release agents, and one or more inert excipients, such as starches, polyols, granulating agents, microcrystalline cellulose, diluents, lubricants, binders, and disintegrating agents. If desired, tablet dosages of the composition can be coated by standard aqueous or non-aqueous techniques.

The pharmaceutical compositions can be administered orally, e.g. as a tablet, capsule, or pellet containing a predetermined amount, or as a powder or granules containing a predetermined concentration or a gel, paste, solution, suspension, emulsion, syrup, bolus, electuary, or slurry, in an aqueous or non-aqueous liquid, containing a predetermined concentration. Orally administered compositions can include binders, lubricants, inert diluents, flavouring agents, and humectants. Orally administered compositions such as tablets can optionally be coated and can be formulated so as to provide sustained, delayed or controlled release of the mixture therein.

The pharmaceutical compositions can also be administered by rectal suppository, aerosol tube, naso-gastric tube or direct infusion into the gastrointestinal tract.

The pharmaceutical compositions can also include therapeutic agents such as antiviral agents, antibiotics, probiotics, analgesics, and anti-inflammatory agents. The proper dosage of these compositions for a non-infant human can be determined in a conventional manner, based upon factors such immune status, body weight and age. In some cases, the dosage will be at a concentration similar to that found for the HMO in human breast milk. The required amount would generally be in the range from about 1 g to about 20 g per day, in certain embodiments from about 2 to about 15 g per day, for example from about 3 g to about 7.5 g per day. Appropriate dose regimes can be determined by conventional methods.

The synthetic composition, in any of the aspects of the invention disclosed above, can also be a nutritional composition. It can contain sources of protein, lipids and/or digestible carbohydrates and can be in powdered or liquid forms. The composition can be designed to be the sole source of nutrition or a nutritional supplement.

Suitable protein sources include milk proteins, soy protein, rice protein, pea protein and oat protein, or mixtures thereof. Milk proteins can be in the form of milk protein concentrates, milk protein isolates, whey protein or casein, or mixtures of both. The protein can be whole protein or hydrolysed protein, either partially hydrolysed or extensively hydrolysed. Hydrolysed protein offers the advantage of easier digestion which can be important for non-infants with inflamed GI tracts.

The protein can also be provided in the form of free amino acids. The protein can comprise about 5% to about 30% of the energy of the nutritional composition, normally about 10% to 20%.

The protein source can be a source of glutamine, threonine, cysteine, serine, proline, or a combination of these amino acids. The glutamine source can be a glutamine dipeptide and/or a glutamine enriched protein. Glutamine can be included due to the use of glutamine by enterocytes as an energy source. Threonine, serine and proline are important amino acids for the production of mucin. Mucin coats the gastrointestinal tract and can improve mucosal healing. Cysteine is a major precursor of glutathione, which is key for the antioxidant defences of the body.

Suitable digestible carbohydrates include maltodextrin, hydrolysed or modified starch or corn starch, glucose polymers, corn syrup, corn syrup solids, high fructose corn syrup, rice-derived carbohydrates, pea-derived carbohydrates, potato-derived carbohydrates, tapioca, sucrose, glucose, fructose, sucrose, lactose, honey, sugar alcohols (e.g., maltitol, erythritol, sorbitol), or mixtures thereof. Preferably the composition is free from lactose. Generally digestible carbohydrates provide about 35% to about 55% of the energy of the nutritional composition. Preferably the nutritional composition is free from lactose. A particularly suitable digestible carbohydrate is a low dextrose equivalent (DE) maltodextrin.

Suitable lipids include medium chain triglycerides (MCT) and long chain triglycerides (LCT). Preferably the lipid is a mixture of MCTs and LCTs. For example, MCTs can comprise about 30% to about 70% by weight of the lipids, more specifically about 50% to about 60% by weight. MCTs offer the advantage of easier digestion which can be important for non-infants with inflamed GI tracts. Generally, the lipids provide about 35% to about 50% of the energy of the nutritional composition. The lipids can contain essential fatty acids (omega-3 and omega-6 fatty acids). Preferably these polyunsaturated fatty acids provide less than about 30% of total energy of the lipid source. It is particularly preferred that the composition contains a source of omega-3 polyunsaturated fatty acids; for example fish oil, docosahexaenoic acid, α-Linolenic acid and/or eicosapentaenoic acid. The polyunsaturated fatty acid may also be dihomo-dietary γ-linolenic acid (DGLA).

Suitable sources of long chain triglycerides are rapeseed oil, sunflower seed oil, palm oil, soy oil, milk fat, corn oil, high oleic oils, and soy lecithin. Fractionated coconut oils are a suitable source of medium chain triglycerides. The lipid profile of the nutritional composition is preferably designed to have a polyunsaturated fatty acid omega-6 (n-6) to omega-3 (n-3) ratio of about 4:1 to about 10:1. For example, the n-6 to n-3 fatty acid ratio can be about 6:1 to about 9:1.

The nutritional composition preferably also includes vitamins and minerals. If the nutritional composition is intended to be a sole source of nutrition, it preferably includes a complete vitamin and mineral profile. Examples of vitamins include vitamins A, B-complex (such as B1, B2, B6 and B12), C, D, E and K, niacin and acid vitamins such as pantothenic acid, folic acid and biotin. Examples of minerals include calcium, iron, zinc, magnesium, iodine, copper, phosphorus, manganese, potassium, chromium, molybdenum, selenium, nickel, tin, silicon, vanadium and boron. A source of vitamin D is particularly preferred.

The nutritional composition can also include a carotenoid such as lutein, lycopene, zeaxanthin, and beta-carotene. The total amount of carotenoid included can vary from about 0.001 μg/ml to about 10 μg/ml. Lutein can be included in an amount of from about 0.001 μg/ml to about 10 μg/ml, preferably from about 0.044 μg/ml to about 5 g/ml of lutein. Lycopene can be included in an amount from about 0.001 μg/ml to about 10 μg/ml, preferably about 0.0185 mg/ml to about 5 g/ml of lycopene. Beta-carotene can comprise from about 0.001 μg/ml to about 10 mg/ml, for example about 0.034 μg/ml to about 5 μg/ml of beta-carotene.

The nutritional composition preferably also contains reduced concentrations of sodium; for example, from about 300 mg/l to about 400 mg/l. The remaining electrolytes can be present in concentrations set to meet needs without providing an undue renal solute burden on kidney function. For example, potassium is preferably present in a range of about 1180 to about 1300 mg/l; and chloride is preferably present in a range of about 680 to about 800 mg/l.

The nutritional composition can also contain various other conventional ingredients such as preservatives, emulsifying agents, thickening agents, buffers, fibres and prebiotics (e.g. fructooligosaccharides, galactooligosaccharides), probiotics (e.g. *B. animalis* subsp. *lactis* BB-12, *B. lactis* HN019, *B. lactis* Bi07, *B. infantis* ATCC 15697, *L. rhamnosus* GG, *L. rhamnosus* HNOOI, *L. acidophilus* LA-5, *L. acidophilus* NCFM, *L. fermentum* CECT5716, *B. longum* BB536, *B. longum* AH1205, *B. longum* AH1206, *B. breve* M-16V, *L. reuteri* ATCC 55730, *L. reuteri* ATCC PTA-6485, *L. reuteri* DSM 17938), antioxidant/anti-inflammatory compounds including tocopherols, carotenoids, ascorbate/vitamin C, ascorbyl palmitate, polyphenols, glutathione, and superoxide dismutase (melon), other bioactive factors (e.g. growth hormones, cytokines, TFG-β), colorants, flavours, and stabilisers, lubricants, and so forth.

The nutritional composition can be in the form of a soluble powder, a liquid concentrate, or a ready-to-use formulation. The composition can be fed to a non-infant via a nasogastric tube or orally. Various flavours, fibres and other additives can also be present.

The nutritional compositions can be prepared by any commonly used manufacturing techniques for preparing nutritional compositions in solid or liquid form. For example, the composition can be prepared by combining various feed solutions. A protein-in-fat feed solution can be prepared by heating and mixing the lipid source and then adding an emulsifier (e.g. lecithin), fat soluble vitamins, and at least a portion of the protein source while heating and stirring. A carbohydrate feed solution is then prepared by adding minerals, trace and ultra-trace minerals, thickening or suspending agents to water while heating and stirring. The resulting solution is held for 10 minutes with continued heat and agitation before adding carbohydrates (e.g. the HMOs and digestible carbohydrate sources). The resulting feed solutions are then blended together while heating and agitating and the pH adjusted to 6.6-7.0, after which the composition is subjected to high-temperature short-time processing during which the composition is heat treated, emulsified and homogenized, and then allowed to cool. Water soluble vitamins and ascorbic acid are added, the pH is adjusted to the desired range if necessary, flavours are added, and water is added to achieve the desired total solid level.

For a liquid product, the resulting solution can then be aseptically packed to form an aseptically packaged nutritional composition. In this form, the nutritional composition can be in ready-to-feed or concentrated liquid form. Alternatively, the composition can be spray-dried and processed and packaged as a reconstitutable powder.

When the nutritional product is a ready-to-feed nutritional liquid, the total concentration of HMOs in the liquid, by weight of the liquid, is from about 0.0001% to about 2.0%, including from about 0.001% to about 1.5%, including from about 0.01% to about 1.0%. When the nutritional product is a concentrated nutritional liquid, the total concentration of HMOs in the liquid, by weight of the liquid, is from about 0.0002% to about 4.0%, including from about 0.002% to about 3.0%, including from about 0.02% to about 2.0%.

The synthetic composition, preferably the nutritional composition, can also be in a unit dosage form such as a capsule, tablet or sachet/stick pack. For example, the synthetic composition, preferably the nutritional composition, can be in a tablet form or powder form comprising the HMOs, and one or more additional components to aid formulation and administration, such as diluents, excipients, antioxidants, lubricants, colorants, binders, disintegrants, and the like.

Suitable diluents, excipients, lubricants, colorants, binders, and disintegrants include polyethylene, polyvinyl chloride, ethyl cellulose, acrylate polymers and their copolymers, hydroxyethyl-cellulose, hydroxypropylmethylcellulose (HPMC), sodium carboxymethylcellulose, polyhydroxyethyl methylacrylate (PHEMA), polyvinyl alcohol (PVA), polyvinyl pyrrolidone (PVP), polyethylene oxide (PEO), or polyacrylamide (PA), carrageenan, sodium alginate, polycarbophil, polyacrylic acid, tragacanth, methyl cellulose, pectin, natural gums, xanthan gum, guar gum, karaya gum, hypromellose, magnesium stearate, microcrystalline cellulose, and colloidal silicon dioxide. Suitable antioxidants are vitamin A, carotenoids, vitamin C, vitamin E, selenium, flavonoids, polyphenols, lycopene, lutein, lignan, coenzyme Q10 ("CoQlO") and glutathione.

The unit dosage forms, especially those in sachet or stick pack form, can also include various nutrients including macronutrients. Particularly preferred nutrients are a source of vitamin D, omega-3 polyunsaturated fatty acids, and probiotics as described above.

The proper dosage of the HMO or synthetic composition can be determined in a conventional manner, based upon factors such as symptom severity, immune status, body weight and age. In some cases, the dosage will be at a concentration similar to that found for the HMOs in human breast milk. The required amount would generally be in the range from about 1 g to about 20 g per day, in certain embodiments from about 1 g to about 15 g per day, for example from about 2 g to about 10 g per day, in certain embodiments from about 3 g to about 7.5 g per day. Appropriate dose regimes can be determined by conventional methods. Ideally, a dose of about 2 g to about 10 g per day is administered with the exact amount selected depending upon whether symptoms are being treated (generally a higher dose) or secondary prevention is intended (lower dose).

The HMO or synthetic composition can be presented in the form of a pack comprising at least 14 individual daily doses of an effective amount of the human milk oligosaccharide. The daily doses are preferably in sachet/stick pack form but may be in any suitable form. Each dose preferably contains about 1 g to about 20 g of the human milk oligosaccharide, more preferably about 2 g to about 15 g, for example about 2 g to about 10 g. Preferably, the pack comprises at least 21 daily doses, more preferably at least 28 daily doses. Most suitable packs contain sufficient for 4 weeks or a full month. The pack can include instructions for use.

An appropriate dose can be determined based on several factors, including, for example, body weight and/or condition, the severity of symptoms, the incidence and/or severity of side effects and the manner of administration. An effective amount may be any amount that enhances executive function in a non-infant. Enhancements in executive function may be measured by well-known tests as detailed hereinabove. The enhancement of executive function may only be detectable after more than 6 months, 1 year, for example more than 5 years, more than 10 years, more than 20 years. It is well within the purview of the skilled person to determine an effective dose based upon the information herein and the knowledge in the field.

Appropriate dose ranges may be determined by methods known to those skilled in the art. During an initial treatment phase, the dosing can be higher (for example 3 g to 15 g per day, preferably 4 g to 10 g per day, more preferably 4 g to 7.5 g per day). During a maintenance phase, the dosing can be reduced (for example, 1 to 10 g per day, preferably 2 mg to 5 g per day, more preferably 2 g to 5 g per day). If the composition comprising an HMO comprises 3'-sialyllactose (3'-SL) and 6'-sialyllactose (6'-SL), it may be particularly beneficial if the 3'-sialyllactose (3'-SL) and 6'-sialyllactose (6'-SL) are comprised in a composition in a weight ratio between 10:1 and 1:10, such as between 10:1 and 2:1, between 8:1 and 3:1, between 6:1 and 3:1, between 5:1 and 3:1, between 5:1 and 4:1, or between 4.7:1 and 4.1:1.

The duration of treatment can be determined based on several factors, including, for example, body weight and/or condition, the severity of symptoms, the incidence and/or severity of side effects. Preferably, the duration is at least 14 days, more preferably at least 3 weeks; even more preferably more than 4 weeks. The synthetic composition or HMOs may also be taken chronically.

A certain aspect of the invention is a use of
one or more human milk oligosaccharides (HMOs),
a synthetic composition comprising one or more human milk oligosaccharides (HMOs), or
a pack comprising at least 14 individual daily doses of an effective amount of one or more human milk oligosaccharides,
in the dietary management of a non-infant human in need of enhancing executive function. The HMOs, synthetic composition and pack are disclosed above.

It should be appreciated that all features of the present invention disclosed herein can be freely combined and that variations and modifications may be made without departing from the scope of the invention as defined in the claims. Furthermore, where known equivalents exist to specific features, such equivalents are incorporated as if specifically referred to in this specification.

As used in this disclosure and the appended claims, the singular forms "a," "an" and "the" include plural referents unless the context clearly dictates otherwise. Thus, for example, reference to "an ingredient" or "the ingredient" includes two or more ingredients. The term "and/or" used in the context of "X and/or Y" should be interpreted as "X," or "Y," or "X and Y." Where used herein, the term "example," particularly when followed by a listing of terms, is merely exemplary and illustrative, and should not be deemed to be exclusive or comprehensive.

As used herein, "about" is understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number. A range that is "between" two values includes those two values. Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein are by weight of the total weight of the composition unless expressed otherwise. When reference is made to the pH, values correspond to pH measured at 25° C. with standard equipment.

The relative term "enhance" and "decrease" refer to the effects of an HMO or a composition comprising an HMO as disclosed herein on executive function (for example the effect on different cognitive skills known to makeup executive function e.g. attention or impulsivity, working memory, cognitive flexibility. This may need to be considered holistically) in a non-infant in comparison to a non-infant that is not administered an HMO or composition comprising an HMO. It is well within the purview of the skilled person to assess an improvements, increases or enhancements. The enhancement of executive function (different cognitive skills known to make up executive function e.g. cognitive flexibility, working memory, attention and/or decrease in impulsivity) may only be detectable after more than 1 year, for example more than 5 years, more than 10 years, more than 20 years.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. Moreover, the description of some steps as "optional" does not imply that the other steps which are not explicitly described as optional are necessarily required. Where the text refers simply to a composition, this may be a nutritional composition.

There now follows a series of non-limiting examples that serve to illustrate the invention.

EXAMPLES

Example 1

Methods—Behavioural Study 53 female piglets (Gottingen minipigs, Ellegaard, Denmark) were subjected to the holeboard tests after weaning. At 1 week of age, formula-fed (N=45) piglets were separated from the sows, and housed in mixed groups of 2 piglets in pens (2.5 m×1 m) enriched with shredded straw as bedding, and equipped with a squeeze ball and a dog bed. In addition, 8 piglets were cross-fostered and kept with 3 sows until 10 weeks of age (natural suckling piglets). After being weaned from the maternal milk, at 10 weeks of age, the natural suckling piglets were housed in the same conditions than the formula-fed piglets. Two metallic chains were also added to the pens as additional enrichment material.

Treatments. The milk intervention was from 1 to 10 weeks of age. At 1 week of age, the formula-fed piglets were randomly allocated to 1 of 4 milk formulas, enriched with different prebiotic mix (milk A: 3'-SL and 6'-SL, milk B: 2'-FL+DFL+LNT+LNnT, milk C: 2'-FL+DFL+LNT+LNnT+3'-SL+6'-SL) or with no prebiotics (control milk). The natural suckling piglets were fed the maternal milk during the whole period of nutritional intervention. After being weaned from the milk, at 10 weeks of age piglets were fed a high-energy obesogenic diet. This experimental setting resulted in 5 treatment groups: milk A (N=12), milk B (N=12), milk C (N=10), control milk (N=11) and natural suckling (N=8).

Both pigs of each pen were individually tested in a spatial holeboard task to assess their spatial cognitive (memory and learning) performance. The holeboard arena (3 m×3 m) had black, wooden, 80-cm-high walls and 4 entrances with guillotine doors. In the arena, 16 grey metallic buckets (Ø12 cm-H12 cm) were screwed to the floor in a 4×4 matrix, 4 of which were baited with small pieces of apple (~12×12×20 mm). Piglets inside the arena were able to see the walls of the room and the ceiling with the ventilation duct and the light tubes. Piglets were deprived from feed overnight during the whole period of holeboard testing.

From approximately 16.5 to 19 weeks of age, piglets were individually subjected to 2 massed trials (i.e. performed a few minutes apart) per day on 12 consecutive working days, i.e. 24 acquisition trials. Different entrances were used daily, with 2 different entrances per day of test (i.e. 1 entrance per trial). The trial started when the piglet had its 4 legs in the holeboard arena and ended when the piglet found all 4 rewards or after 180 s. Every time the piglet visited a baited bucket for the first time, a clicker sound was produced to facilitate learning. If the piglet completed the task (i.e. found the 4 rewards in fewer than 180 s), the exit (south) guillotine door was opened, the piglet received half of a white grape. If the piglet did not complete the task within the 180 s, a police siren sound was produced; the piglet did not receive a reward. After the 2 piglets per pen had been tested twice, all the pen mates were guided back into their home pen and their morning milk ration was distributed.

After the acquisition phase was completed, piglets were individually subjected to 16 reversal trials, with 2 massed trials per day on 8 consecutive working days. The procedure was the same procedure as in the acquisition phase, but piglets were assigned to a different configuration of baited buckets.

The following parameters were scored live using The Observer XT 10 (Noldus Information Technology, Wageningen, The Netherlands): all visits and revisits to all buckets, latencies to all bucket visits, trial duration, total number of defecations, urinations and escape attempts during the trial. From the parameters recorded during the test, variables were calculated a posteriori according to van der Staay et al. *Neurosci. Biobehav. Rev.* 36, 379 (2012) (Table 1).

TABLE 1

| Parameters calculated a posteriori in the holeboard task | |
|---|---|
| Description | Calculation |
| Working memory (WM) scores (ability of pigs to avoid revisits to baited buckets during a trial (short-term memory)) | Number of rewarded visits/number of visits and revisits to the set of baited buckets |
| Reference memory (RM) scores (ability of pigs to discriminate between baited and unbaited buckets (long-term memory)) | Number of visits and revisits to the set of baited buckets/number of visits and revisits to all buckets |
| General WM scores (ability of pigs to avoid revisits to buckets already visited during a trial (short-term memory)) | Number of different buckets visited/number of visits and revisits to all buckets |

During the acquisition phase, all pigs exhibited an increase of executive function performance visible by WM, RM and general WM score increasing linearly over time, and the number of WM, RM and general WM errors decreasing linearly over time.

Figure 1:
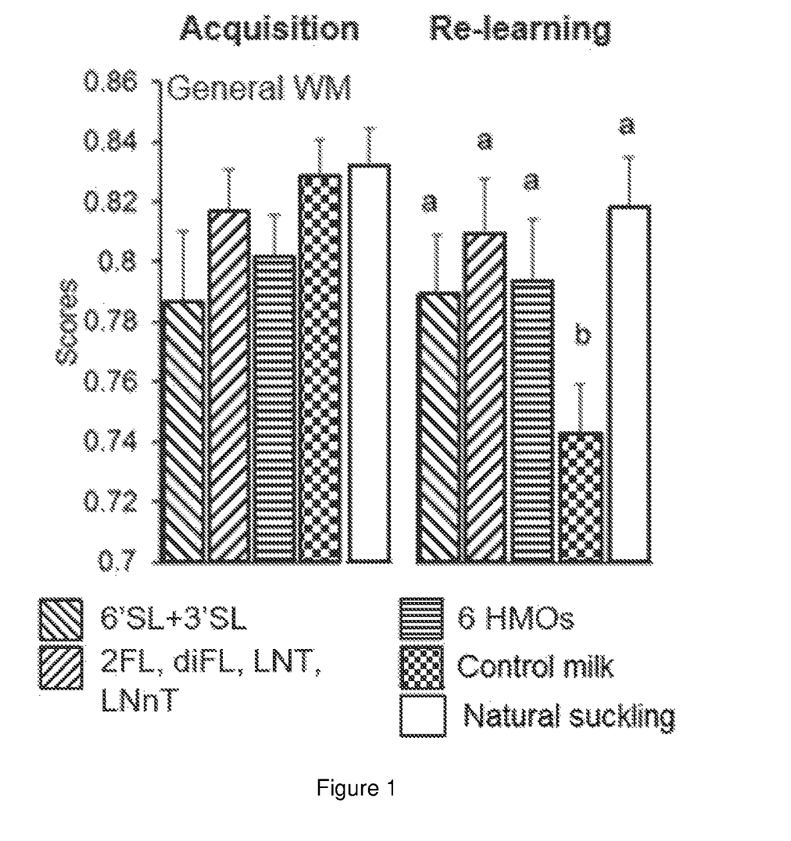
FIG. 1: Performance score for pigs exposed to pre-weaning diet supplemented with milk A, B, C, control milk or being reared by the sow, computed to evaluate general working memory. Different letters indicate significant differences ($p<0.05$).
Figure 2:
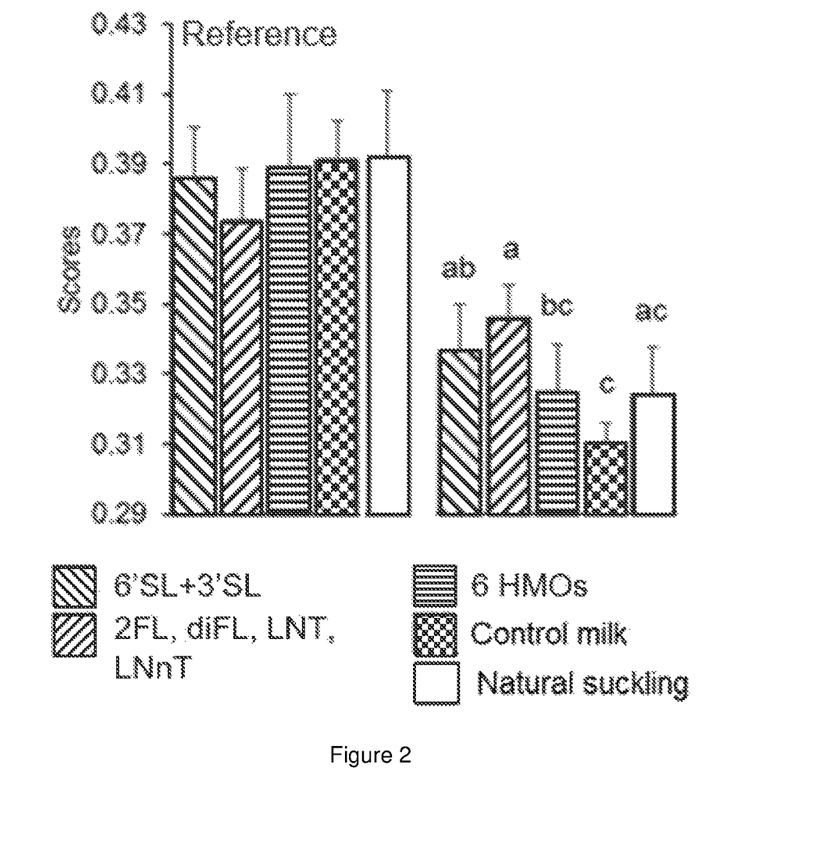
FIG. 2: Performance score for pigs exposed to pre-weaning diet supplemented with milk A, B, C, control milk or being reared by the sow, computed to evaluate reference memory. Different letters indicate significant differences ($p<0.05$).
Figure 3:
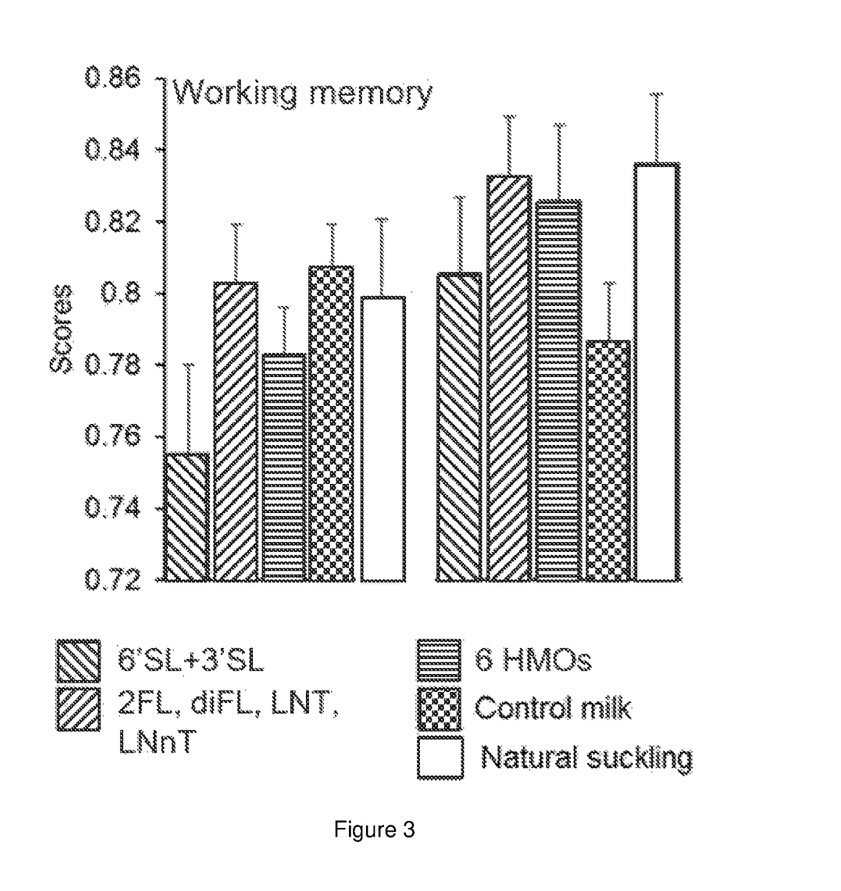
FIG. 3: Performance score for pigs exposed to pre-weaning diet supplemented with milk A, B, C, control milk or being reared by the sow, computed to evaluate working memory. Different letters indicate significant differences ($p<0.05$).

During the reversal phase, all pigs exhibited an increase of executive function performance visible by WM, RM and general WM score increasing linearly over time, and the number of WM, RM and general WM errors decreasing linearly over time. This increase of RM, WM and general WM performance was decreased (significantly for general WM and RM) in the control milk group compared to natural suckling piglets and, surprisingly, this deficit was restored by the presence of HMOs in the milk to similar levels as observed in the natural suckling group (see FIGS. 1-3).

Example 2

Animals and Rearing Conditions

Adult wild-type (WT) B6.129 and heterozygous (HZ) B6.129-St6gal1$^{tm2Jxm}$ breeding pairs (four males and four females and three males and four females, respectively) were purchased from a commercial breeder (The Jackson Laboratory). Upon arrival, same-sex mice were housed in same-sex groups of 2-3 in type-1 polycarbonate cages (33.0×13.0×14.0 cm) equipped with sawdust bedding, an enrichment bag (Mucedola, Settimo Milanese, Italy), metal top and ad libitum water and food pellets (Mucedola, Settimo Milanese, Italy). Mice were maintained on a reversed 12-h-light-dark cycle (light on at 7:00 PM) in an air-conditioned room (temperature 21±1° C. and relative humidity 60±10%). Two weeks after arrival, breeding triads (one male, two females) were formed. After two weeks of mating, male mice were removed and females were housed individually in standard type-1 cages. Females were checked daily for delivery and the day in which they gave birth was designated as postnatal day (PND) 0. Apart from cage cleaning once a week, dams and their offspring were kept undisturbed until weaning (on PND 25). At weaning, male and female mice were separated and located in same-sex same-litter cages; additionally, male mice were marked through ear clipping and the ear tissue removed through this procedure was used for genotyping. Homozygous knock-out (KO) and WT mice were then used for the experiments.

Fostering Procedures and Rearing

Fourteen wild type (WT) and 14 St6Gal1 Homozygous (hereafter KO) female mice have been mated with seven WT and seven KO male mice respectively. Out of this batch, 10 WT and 10 KO dams gave birth to a viable offspring. Day of birth has been designated as postnatal day (PND) 0. The fostering procedure (see FIG. 1 for details), performed between 10:00 and 13:00, required the use of four dams (two WT and two KO) at the same time. Thus, to minimise the number of subjects to be discarded due to the absence of foster dams, fostering procedures were performed between 24 and 60 hours after birth. On the day of fostering, we first removed the dams from their cage and then sexed and marked the offspring through toe tattoo ink puncture. After sexing and marking procedures were completed, pups were moved to the cage housing the foster dam and covered with sawdust. Each offspring was transferred to a foster dam in order to expose all experimental subjects to the same condition. Each dam nurtured a mixed litter composed of WT and KO male and female offspring (1:1 ratio among all variables whenever possible). At eye opening and at adult age, prefrontal cortex and hippocampus brain samples were collected for gene expression analyses.

The following experimental groups were constituted:
WT offspring reared to WT dams (WT to WT)
WT offspring reared to KO dams (WT to KO)
KO offspring reared to WT dams (KO to WT)
KO offspring reared to KO dams (KO to KO)

Total RNA Extraction and QC

Total RNA is extracted using the Agencourt RNAdvance Tissue Kit (Beckman Coulter): Lysis was done in 450 μl. 400 μl of Lyzate was extracted. Elution volume 50 μl Quantification is performed using Quant It Ribogreen assay (Life Technologies) QC assessment is performed using Standard sensitivity RNA kit on Fragment Analyzer 96 (Agilent).

Samples Libraries Preparation

Libraries are generated using the QuantSeq 3' mRNA-Seq Library Prep Kit (FWD) HT for Illumina from Lexogen. It is designed to generate Illumina compatible sequences close to the 3' end of polyadenylated RNA.

The kit uses total RNA as input, hence no prior poly(A) enrichment or rRNA depletion is needed. Library generation starts with oligodT priming containing the Illumina-specific Read 2 linker sequence. After first strand synthesis the RNA is removed. Second strand synthesis is initiated by random priming and a DNA polymerase. The random primer contains the Illumina-specific Read 1 linker sequence. No purification is required between first and second strand synthesis. Second strand synthesis is followed by a magnetic bead-based purification step. Sequences required for cluster generation for sequencing are introduced during library amplification step. Double stranded cDNA are amplified by PCR. During this step individual barcodes indexes are introduced in order to multiplex samples. NGS reads are generated towards the poly(A) tail and directly correspond to the mRNA. See on FIG. 1 for details. Libraries are quantified with Quant it Picogreen (Life Technologies). Size pattern is controlled with the High Sensitivity NGS Fragment Analysis kit on a Fragment Analyzer (Agilent). Libraries are pooled at an equimolar ratio (i.e. an equal quantity of each sample library) and clustered at a concentration of 9 pM on single read (SR) sequencing flow cell (Illumina). Sequencing is performed for 65 cycles on a HiSeq 2500 (Illumina) using the HiSeq SR Cluster Kit v4 cBot, HiSeq SBS Kit V4 50 cycle kit (Sequencing by Synthesis). Primary data quality control is performed during the sequencing run to ensure the optimal flow cell loading (cluster density) and check the quality metrics of the sequencing run (QC30). The optimal number of density of clusters detected by image analysis is between 850 and 1000 K/mm$^2$. Performing a run at optimal cluster density involves finding a balance between under clustering that maintains data of good quality but results in lower data output and over clustering that can lead to poor run performance. The percentage ≥30, means the percentage of bases with a quality Phred score of 30 or higher. It is a measure of the quality of the identification of the nucleobases generated. The Phred score is logarithmically linked to error probabilities. A Phred score equal to 30 means a probability of incorrect base assignment of 1 in 1000, so a base call accuracy of 99.9%. Regarding Illumina specification, the score should be a minimum of 80%.

Data Analyses

Genes with very low counts are unlikely to be differentially expressed between groups. We filtered lowly expressed genes by selecting only genes with at least 5 reads in at least 8 samples. The threshold on the number of samples ensures that the genes will be expressed in the smallest group (which contains 8 samples). The filtering step is done on the CPM values which takes the library size into account. In our case it corresponds to a threshold of 2.427 on the CPM values. We also discarded genes with no annotation. We kept 11523 features with these filtering criteria. We normalized using TMM method.

Results

Figure 4:
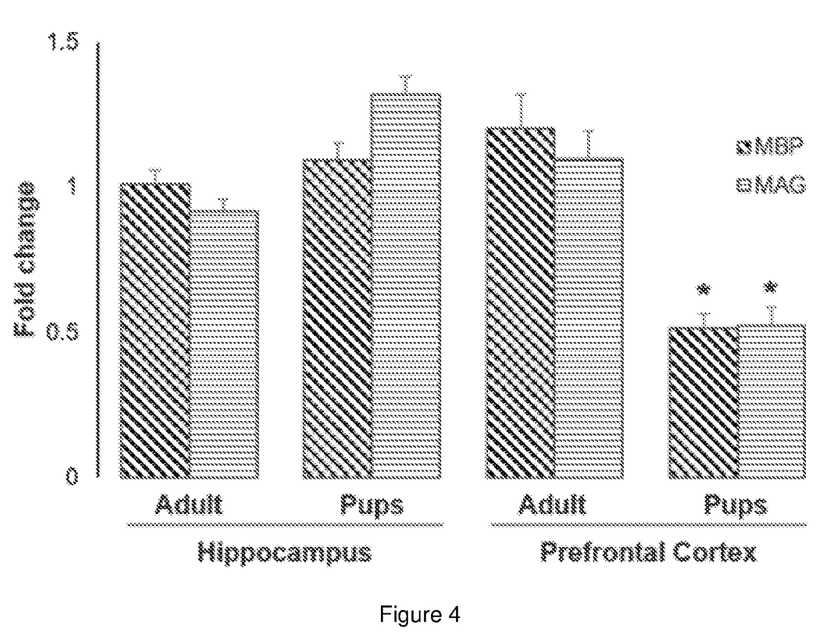
FIG. 4: Expression of myelin gene in the prefrontal and hippocampal brain samples of pups and adult mice that received milk without 6'-SL normalized to expression level of mice receiving milk with 6'-SL. Asterisks indicates significant differences to control ($p<0.05$).

The expression of multiple genes related to myelination was reduced in the mice receiving milk without 6'-SL only in the prefrontal cortex during early life, this was neither observed in adulthood nor in the hippocampus at any of the two ages. FIG. 4 show the reduction of 50% of the expression of myelin basic protein (MBP) and myelin-associated glycoprotein (MAG), two key protein of the myelin sheath, in mice receiving milk without 6'-SL (gene expression quantified in fold change relative to control mice). When we investigated the impact of absence of 6'-SL in early life on the Kyoto Encyclopedia of Genes and Genomes pathways, we identified that both the myelination and the myelin sheath pathway were down-regulated in mice receiving milk without 6'-SL. This again was only visible in the prefrontal cortex and not in the hippocampus (at adult or early life age). These results clearly indicates that the presence of 6'-SL in maternal milk is necessary to observe an optimal myelination of the prefrontal cortex, especially during early life. Interestingly the prefrontal cortex is known to be a key brain region to mediate executive functions.

Example 3—Nutritional Composition

A ready to feed nutritional composition is prepared from water, maltodextrin, corn syrup, sugar, milk protein concentrate, vegetable oil (canola, high oleic sunflower and corn), soy protein isolate, acacia gum, flavours, 2'-FL and DFL, potassium citrate, magnesium phosphate, cellulose gel and gum, calcium carbonate, sodium ascorbate, soy lecithin, choline bitartrate, calcium phosphate, alpha-tocopheryl acetate, ascorbic acid, carrageenan gum, ferric pyrophosphate, flavours, sweeteners (Stevie), vitamin A palmitate, niacinamide, vitamin D3, calcium pantothenate, manganese sulphate, copper sulphate, pyridoxine hydrochloride, thiamine hydrochloride, beta carotene, riboflavin, chromium chloride, folic acid, biotin, potassium iodide, phytonadione, sodium selenite, sodium molybdate, vitamin B12.

The composition provides a nutritional supplement which is a good source of protein, low in fat, vitamins, minerals and antioxidants, and meets FODMAP criteria. Further, the composition contains 2'-FL and DFL which are able to promote the growth of beneficial intestinal bacteria and improve gut barrier function.

Example 4—Capsule Composition

A capsule is prepared by filling about 1 g of 2'-FL and DFL into a 000 gelatine capsule using a filing machine. The capsules are then closed. The 2'-FL and DFL is in free flowing, powder form.

The invention claimed is:

1. A method for enhancing executive function, the method comprising:
providing to a non-infant human, a composition formulated to enhance working memory performance in the non-infant human, the composition consisting essentially of a prebiotic mixture of synthetic human milk oligosaccharides (HMOs) selected from the group consisting of:
a mixture of the following four HMOs: 2'-fucosyllactose (2'-FL), difucosyllactose (DFL), lacto-N-tetraose (LNT), and lacto-N-neotetraose (LNnT), and
a mixture of the following six HMOs: 2'-FL, DFL, LNT, LNnT, 3'-sialyllactose (3'-SL), and 6'-sialyllactose (6'-SL);
providing instructions to the non-infant human indicating a dosage of the prebiotic mixture of synthetic HMOs to be consumed by the non-infant human, wherein the dosage is from about 0.5 g to about 15 g per day; and
enhancing working memory performance in the non-infant human consuming the indicated dosage of the mixture of synthetic HMOs, wherein enhancing working memory performance refers to enhancing the capacity to temporarily hold and manipulate information for completing cognitive tasks, including planning, problem solving, and/or decision making.

2. The method of claim 1, further comprising enhancing reference memory performance in the non-infant human consuming the dosage of the mixture of synthetic HMOs, wherein enhancing reference memory performance refers to enhancing the capacity to store and retrieve information in long-term memory while performing repeated activities.

3. The method of claim 1, wherein the composition consisting essentially of the prebiotic mixture of synthetic human milk oligosaccharides (HMOs) is provided in a unit dosage form selected from the group consisting of capsule form, tablet form, sachet form, and stick pack form.

4. The method of claim 1, wherein the composition consisting essentially of the prebiotic mixture of synthetic human milk oligosaccharides (HMOs) further includes one or more components that do not have prebiotic or probiotic effects selected from the group consisting of diluents, excipients, antioxidants, lubricants, colorants, binders, and disintegrants.

5. The method of claim 1, wherein a weight ratio of 3'-SL to 6'-SL, if present in the mixture, is from about 5:1 to about 3:1.

6. The method of claim 1, wherein the composition consisting essentially of the prebiotic mixture of synthetic human milk oligosaccharides (HMOs) is effective for enhancing general working memory (GWM) performance in the non-infant human consuming the dosage of the mixture of synthetic HMOs, wherein enhancing general working memory performance refers to maintaining capacity to recall information correctly while performing multistep tasks.

* * * * *